UNITED STATES PATENT OFFICE.

ABEL CONANT, OF LOWELL, MASSACHUSETTS.

IMPROVEMENT IN RAISING BREAD.

Specification forming part of Letters Patent No. 2,816, dated October 12, 1842.

*To all whom it may concern:*

Be it known that I, ABEL CONANT, of Lowell, in the county of Middlesex and State of Massachusetts, have invented a new and Improved Mode of Raising and Making Bread and other Pastry; and I do hereby declare that the following is a full and exact description.

The nature of my invention consists in using tartaric acid, cream of tartar, citric acid, alum, or any other known acid, in a dry state, or any compound of acids, or any compound of which acid or acids are the principal ingredient, in a dry state, and mixing the dry acid or acids or the dry compound, in a dry state, with dry flour; and in dissolving saleratus or other alkali in a sufficient quantity of pure water, sweet milk, or other liquid to neutralize the acids in the flour, and to make it into dough; and in mixing the flour, acids, alkali, and liquids thus prepared into good dough; and in thoroughly kneading the dough so made, and making it into small loaves or rolls and baking immediately; or, if other pastry than bread, in cooking immediately in the usual way after the dough has been prepared substantially as above stated.

To enable others to use my invention, I will proceed to describe the mode of manufacturing and using my yeast, and its operation, which I call "Conant's patent yeast."

I usually take two parts of cream of tartar to one part of alum, or equal parts of both, finely pulverized, and thoroughly mix them together. Of this mixture or yeast I take two tea-spoonfuls to one quart of flour, and thoroughly mix it in the dry state with the dry flour. I then dissolve one tea-spoonful of saleratus in a sufficient quantity of pure water or sweet milk to make the flour so prepared into dough. I then mix the whole together till the dough is thoroughly formed. I then knead the dough five or ten minutes, or the usual time, in the usual way, and make it into rolls or loaves and bake immediately. For other pastry than bread I prepare the dough in a similar way and cook immediately in the usual manner of boiling, frying, or baking, according to the kind. The difference between this and the usual process arises from the fact that when the dry acid is mixed with the dry flour the chemical action with the alkali is delayed until the heat of baking determines this action, and thus a large portion of the carbonic acid is detained in the bread, which in the ordinary process escapes before the bread comes to the baking.

What I claim as my invention, and desire to secure by Letters Patent, is—

The manner of using, as herein described, dry acids or compounds of dry acids thoroughly mixed with dry flour or meal and a solution of alkali in water, sweet milk, or other liquid with which the flour or meal is to be made into dough, for the purpose of puffing up or raising the dough, so that when cooked it will make good light bread or other pastry without destroying the sugar of the flour or meal.

ABEL CONANT.

Witnesses:
ELIZABETH WEEKS,
ELISHA FULLER.